(12) United States Patent
Shimizu et al.

(10) Patent No.: US 7,701,623 B2
(45) Date of Patent: Apr. 20, 2010

(54) IMAGE READING DEVICE, IMAGE READING METHOD AND COPIER

(75) Inventors: Mitsuo Shimizu, Ebina (JP); Norikazu Sakai, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 342 days.

(21) Appl. No.: 11/808,898

(22) Filed: Jun. 13, 2007

(65) Prior Publication Data
US 2008/0117483 A1    May 22, 2008

(30) Foreign Application Priority Data
Nov. 17, 2006   (JP) .............. 2006-311667

(51) Int. Cl.
H04N 1/38   (2006.01)
H04N 1/40   (2006.01)
H04N 1/46   (2006.01)

(52) U.S. Cl. ............ 358/501; 358/462; 358/463; 358/464; 358/465; 358/466; 358/504; 358/505; 358/506

(58) Field of Classification Search .......... None
See application file for complete search history.

(56) References Cited

U.S. PATENT DOCUMENTS 4,876,610 A  * 10/1989 Ohsawa et al. .......... 358/443
2005/0162712 A1 * 7/2005 Shiraishi et al. .......... 358/474
2006/0208083 A1 * 9/2006 Kotlarsky et al. ...... 235/462.01

FOREIGN PATENT DOCUMENTS

| JP | A-2000-324309 | 11/2000 |
| JP | 2002111794 | * 4/2002 |
| JP | A-2002-111974 | 4/2002 |
| JP | A-2002-237922 | 8/2002 |
| JP | A-2005-084741 | 3/2005 |

* cited by examiner

Primary Examiner—Twyler L Haskins
Assistant Examiner—Haris Sabah
(74) Attorney, Agent, or Firm—Oliff & Berridge, PLC (57) ABSTRACT

An image reading device includes: a first light source that irradiates light on a first side of an object; a memory that stores a plurality of parameters for controlling an intensity of the light emitting devices, each of the plurality of parameters corresponding to one of a plurality of groups; a controller that controls an intensity of the light emitting devices in response to one of the plurality of parameters stored in the memory; a first image reading unit that reads reflected light from the first side and generates monochrome image data on the basis of the read reflected light; and a second image reading unit that reads reflected light from the second side and generates monochrome image data on the basis of the read reflected light.

10 Claims, 7 Drawing Sheets

| PATTERN No. | PARAMETER | | |
|---|---|---|---|
| | LED401R | LED401G | LED401B |
| 0 | ××× | ××× | ××× |
| 1 | ××× | ××× | ××× |
| 2 | ××× | ××× | ××× |

| PATTERN No. | PARAMETER | | |
|---|---|---|---|
| | LED401R | LED401G | LED401B |
| 0 | ××× | ××× | ××× |
| 1 | ××× | ××× | ××× |
| 2 | ××× | ××× | ××× |

FIG. 8

| | PATTERN 1 SUITABLE FOR RED AND MAGENTA | PATTERN 2 SUITABLE FOR GREEN AND CYAN | PATTERN 0 SUITABLE FOR ALL COLORS |
|---|---|---|---|
| BLUE | ○ | ○ | ○ |
| GREEN | × | ○ | △ |
| RED | ○ | × | △ |
| YELLOW | ○ | ○ | ○ |
| MAGENTA | ○ | × | △ |
| CYAN | × | ○ | △ |

IMAGE READING DEVICE, IMAGE READING METHOD AND COPIER

CROSS-REFERENCE TO RELATED APPLICATIONS

This application is based on and claims priority under 25 USC 119 from Japanese Patent Application No. 2006-311667 filed Nov. 17, 2006.

TECHNICAL FIELD

The present invention relates to an image reading device, an image reading method and a copier.

RELATED ART

An image reading device having a sheet feeding mechanism, two light sources and two image sensors, one at each side of a sheet, is known. Such an image reading device can simultaneously read images on the front side and the back side of a sheet. Further, such an image reading device is also able to read only an image of the front side by moving a light source parallel to the front side, without the sheet feeding mechanism being operated. Such an image reading device has two different light sources; for example, a xenon lamp for the front side and an LED (Light Emitting Diode) for the back side, according to a configuration of the device.

SUMMARY

An image reading device that can read a color image from the front side of a sheet and a monochrome image from the back side, is known. Such an image reading device has a white LED with a narrow band color filter to pass green light for imitating spectral characteristics of a xenon lamp, thereby decreasing a difference in density between generated images of the front side and the back side.

However, a white LED and a color filter are expensive. Further, to obtain sufficient quantity of light, a large number of white LEDs are necessary.

Therefore, use of white LEDs and color filters increases the cost of the device. In addition, since a color filter is fixed to a white LED, it is difficult to change spectral characteristics.

To decrease the cost, a technique is known to use a combination of red, green, and blue LEDs. However, a mere combination of LEDs has different spectral characteristics from the xenon lamp; thus, it is difficult to decrease a difference in density between generated images of the front side and the back side.

The present invention addresses the problems of the prior arts and provides a technique by which a difference in density between generated images of the front side and the back side of a sheet is decreased, in a case of using two light sources having different spectral characteristics.

According to an aspect of the invention, there is provides an image reading device, including: a first light source that irradiates light on a first side of an object; a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable; a memory that stores a plurality of parameters for controlling an intensity of the light emitting devices, each of the plurality of parameters corresponding to one of the plurality of groups; a controller that controls an intensity of the light emitting devices in response to one of the plurality of parameters stored in the memory; a first image reading unit that reads reflected light from the first side and generates monochrome image data on the basis of the read reflected light; and a second image reading unit that reads reflected light from the second side and generates monochrome image data on the basis of the read reflected light.

BRIEF DESCRIPTION OF DRAWINGS

An exemplary embodiment of the present invention will be described in detail based on the following figures, wherein.

DESCRIPTION OF EXEMPLARY EMBODIMENTS

An exemplary embodiment of the invention will be described by using as an example a copier having a function of an image reading device.

Figure 1:
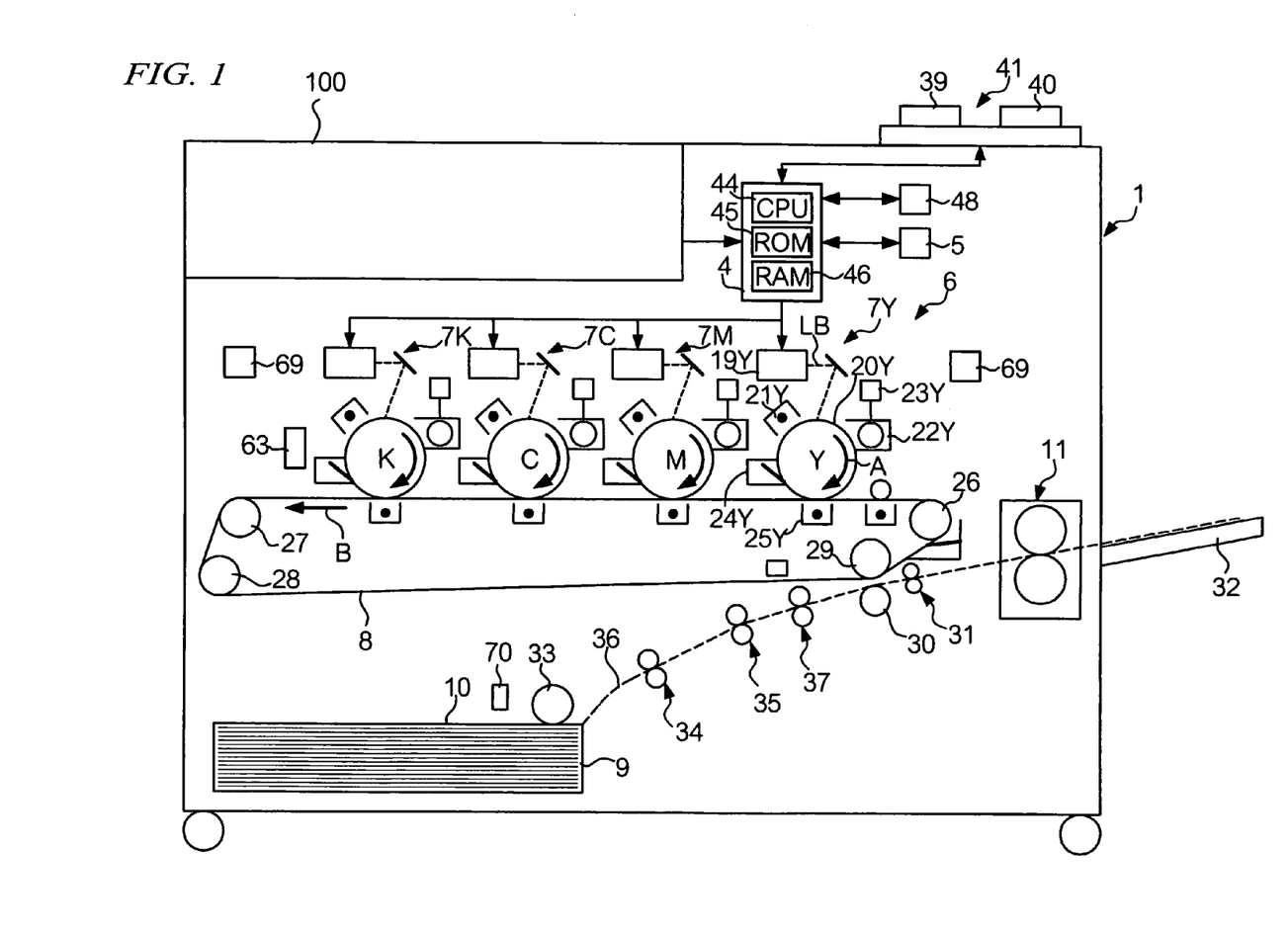
FIG. 1 shows a hardware configuration of a copier 1.

FIG. 1 shows a hardware configuration of a copier 1.

A controller 4 has a CPU (Central Processing Unit) 44, ROM (Read Only Memory) 45, and RAM (Random Access Memory) 46. A storage unit 5 is a nonvolatile memory; for example, a hard disk drive. The storage unit 5 stores programs; for example, an OS (Operating System), and data inputted from an external device. The CPU 44 controls each component of the copier 1 by executing a program stored in the storage unit 5. The ROM 45 stores an IPL (Initial Program Loader). The RAM 46 functions as a work area when the CPU 44 executes a program.

A user interface 41 includes a display 39 and a keypad 40. A user inputs an instruction to the copier 1 via the user interface 41. The display 39 is, for example, a liquid crystalline display device, and displays an image showing, for example, a menu. The display 39 includes a sensor for identifying a position on a screen touched by a user. Thus, the display 39 functions as a touch panel. The keypad 40 includes, for example, a start key, a stop key, a reset key, and a ten-key array. An instruction received by the user interface 41 is transmitted to the CPU 44. The CPU 44 controls a component of the copier 1 in accordance with the received instruction.

A communication I/F (interface) 48 is connected to a network (not shown in the figures), and relays data between the copier 1 and other devices.

An image input unit 100 optically reads an object (document) and outputs a signal. The controller 4 receives the signal and generates raster image data showing an image of the object, on the basis of the signal. Details of the image input unit 100 will be described later.

An image output unit 6 includes, for example, image forming engines 7Y, 7M, 7C and 7K, and a transfer belt 8. The image forming engines 7Y, 7M, 7C and 7K form a toner image of yellow (Y), magenta (M), cyan (C) and black (K), respectively. Since the image forming engines have a common configuration, a description will be given only for the image forming engine 7Y. The image forming engine 7Y has an electrification device 21Y, an exposure device 19Y, a development device 22Y, and a transfer device 25Y, around a photo sensitive drum 20Y.

The photo sensitive drum 20Y has a circular cylinder shape and photosensitivity. The peripheral plane of the photosensitive drum 20Y has photoconductivity.

The electrification device 21Y causes the surface of the photosensitive drum 20Y to be electrified at a certain electric potential. The photosensitive drum 20Y rotates in a direction of arrow A.

The exposure device 19Y receives the raster image data generated by the controller 4. The exposure device 19Y irradiates exposure beam LB. The exposure device 19Y scans the surface of the photosensitive drum 20Y by the exposure beam LB. Thus, an electrostatic image is formed, on the basis of the raster image data, on the surface of the photosensitive drum 20Y.

The development device 22Y is a device that forms a toner image on the basis of the electrostatic image formed on the surface of the photosensitive drum 20Y. The toner image, formed on the surface of the photosensitive drum 20Y, is transferred onto the surface of the transfer belt 8 by an electric field corresponding to a voltage applied to the transfer device 25Y. The transfer is referred to as "primary transfer".

The configuration of the image forming device 7Y is as described above. Similarly to the image forming engine 7Y, the image forming engines 7M, 7C, and 7K form toner images for respective colors. The toner images are transferred onto the transfer belt 8.

A media tray 9 stocks print media 10, which is a sheet-shaped media. The print media 10 is fed from the media tray 9 and is fed through a contact region between a transfer roller and the transfer belt 8. The toner image on the transfer belt 8 is transferred onto the print media 10, by an electric field caused by a voltage applied to the transfer roller 30 and a force at the contact area. The transfer is referred to as "secondary transfer".

A fixing device 11 heat the print media 10 and applies a pressure on the print media 10, to cause the toner image be fixed on the print media 10. The print media 10, with the fixed toner image, is ejected to an output tray 32.

Figure 2:
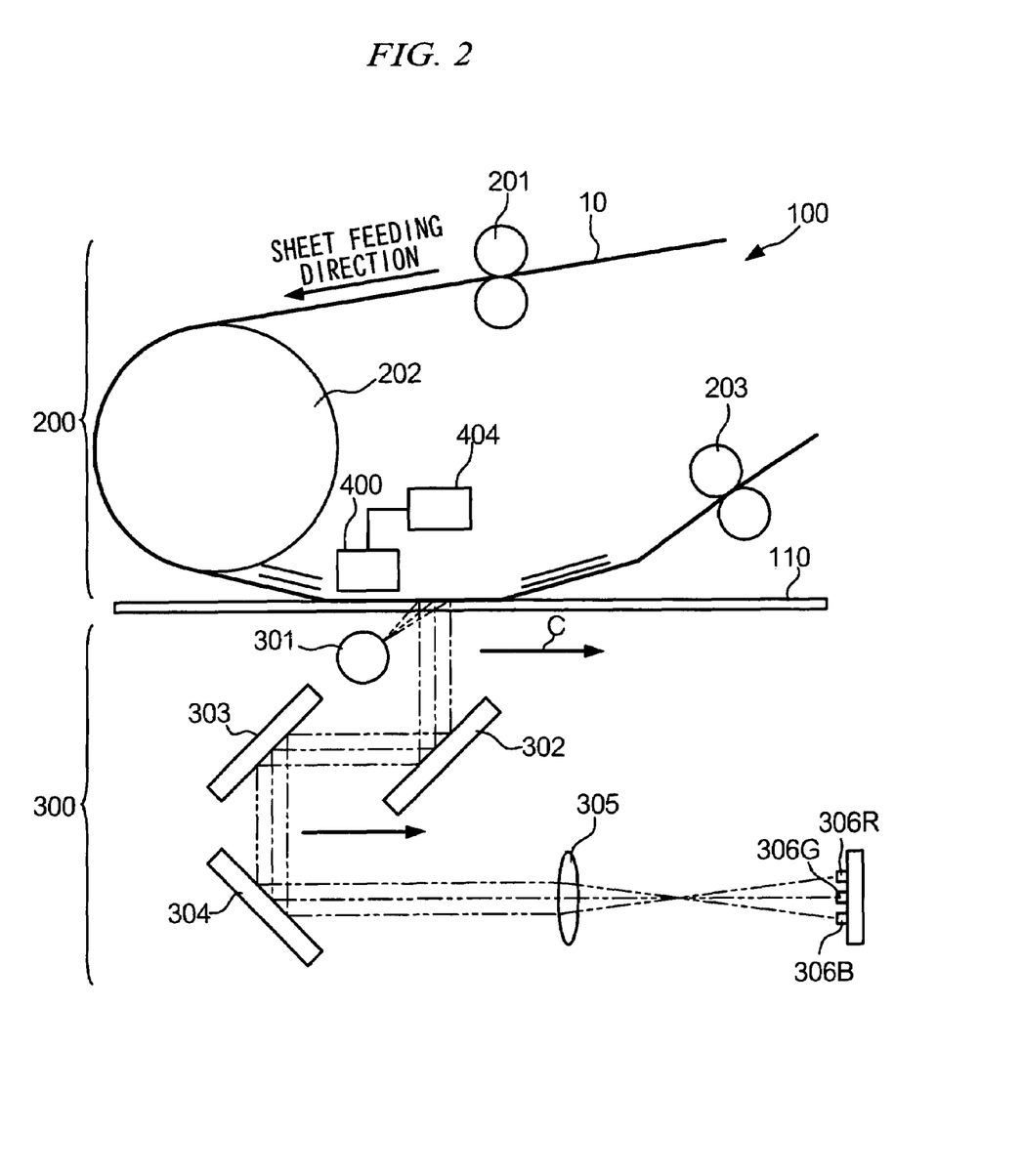
FIG. 2 shows a configuration of the image input unit 100.

FIG. 2 shows a configuration of the image input unit 100. The controller 4 controls the operation of the image input unit 100, by executing a program stored in the storage unit 5.

The image input unit 100 has an automatic sheet feeder 200 that feeds a document to a read position. The document is fed to a read position on a platen glass 110 by a roller 201 and a roller 202. In this description, a side that faces the platen glass 110 is referred to as the "front side", and the other side is referred to as the "back side".

At the read position, an optical system 300, which is an example of a first image reading unit, is provided in the front side. Further, an image sensor 400, which is an example of a second image reading unit, is provided in the back side. After passing the read position, the document is ejected by a roller 203.

The optical system 300 has the following configuration. A xenon lamp 301 irradiates light on the front side of the document. The irradiated light is reflected by the document. The reflected light is lead to CCD (Charge Coupled Device) line sensors 306R, 306G, and 306B, via a lens 305. The optical path is changed by mirrors 302, 303, and 304. The CCD line sensor 306R has plural CCDs. The plural CCDs are laid-out in a straight line that crosses a direction of sheet feeding. The CCD line sensor 306R further has a color filter that passes light having a wavelength range corresponding to red (R). Similarly, the CCD sensors 306G and 306B has color filters corresponding to green (G) and blue (B), respectively. The CCD line sensors 306R, 306G, and 306B output a signal into which the received reflected light is converted.

The optical system 300 outputs a signal showing an image of the document in multi-colors. By use of only the CCD line sensor 306G, only one color component (in this case, green) is read from the reflected light. Since human visual sense for green is similar to that for black, the outputted signal is similar to that of a monochrome image.

The optical system 300 is configured to be used both when the automatic sheet feeder 200 is used and when a user manually puts the document on the platen glass 110 without using the automatic sheet feeder 200. The automatic sheet feeder 200 is mounted on a plane of a body of the copier 1 where the platen glass 110 is provided, by a hinge. The hinge allows the automatic sheet feeder 200 to move pivotally. In a case of not using the automatic sheet feeder 200, the xenon lamp 301 irradiates light on the front side of the document with the xenon lamp 301 and the mirror 302 moving toward a direction of arrow C in FIG. 1. Thus, the reflected light is obtained. The mirrors 303 and 304 move in the same direction as the mirror 302, synchronized to move at a half speed of the mirror 302.

In a case of using automatic sheet feeder 200, the optical system reads an image of the document without moving.

Figure 3A:
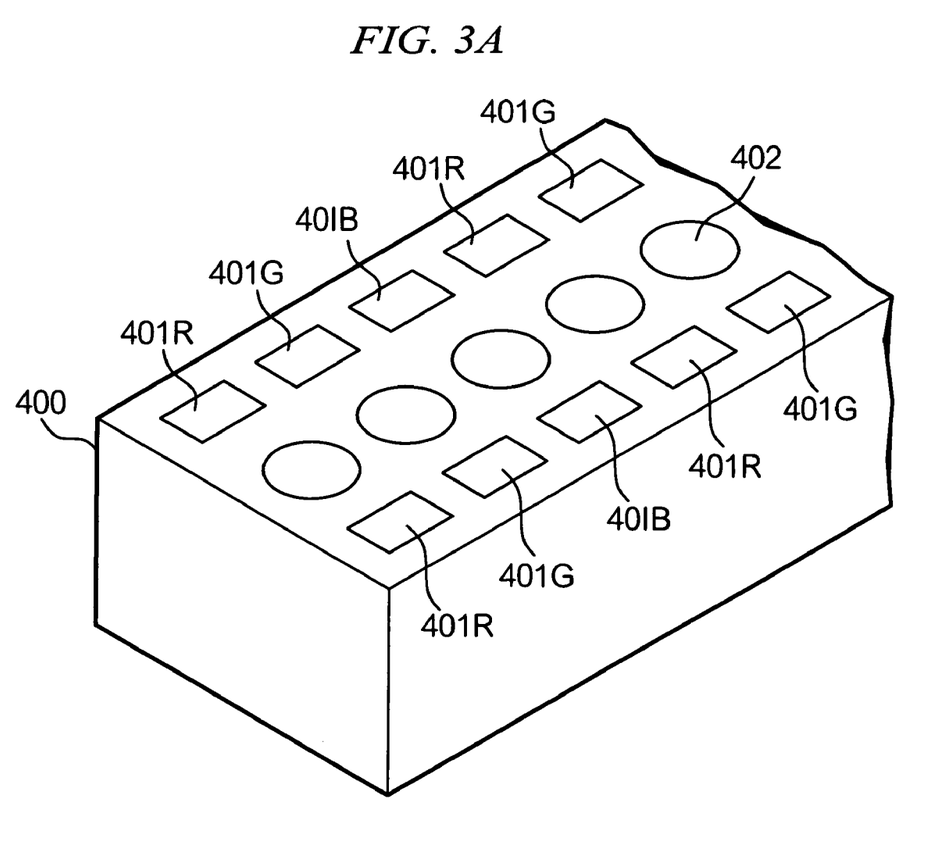
FIG. 3A shows a perspective view of the image sensor 400.
Figure 3B:
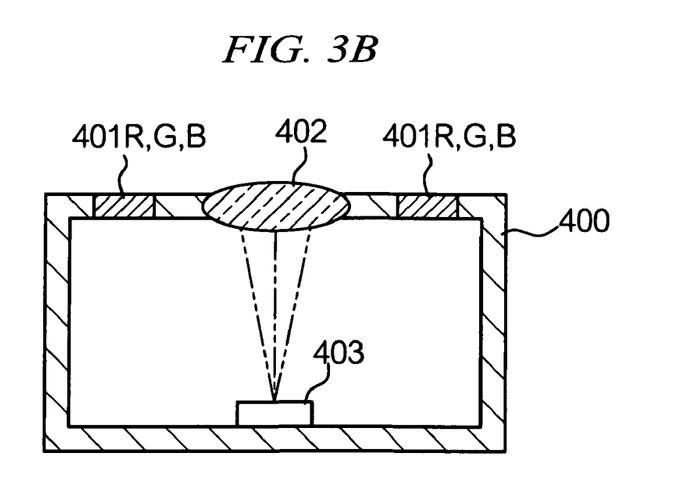
FIG. 3B shows a cross-sectional view of the image sensor.

FIG. 3A shows a perspective view of the image sensor 400. FIG. 3B shows a cross-sectional view of the image sensor wherein the cross section is perpendicular to the longitudinal direction of the image sensor 400. LEDs 401R, 401G, and 401B irradiate light having a range of wavelength corresponding to red, green, and blue, respectively. The image sensor 400 has plural LEDs laid-out as two lines, the lines extending toward a direction perpendicular to the plane shown in FIG. 3B. In each line, the LEDs are repeatedly laid-out in an order of LED401R, LED401G, and LED401G. Between the two lines, plural lenses 402 are laid-out in a straight line, the line extending toward a direction perpendicular to the plane of the FIG. 3B. The image sensor 400 has plural CCDs 403, which are laid-out in a straight line, the line extending toward a direction perpendicular to the plane of the FIG. 3B.

The image sensor 400 is provided at the read position, with the upper plane shown in FIG. 3 sloping in a downward direction relative to the copier. The light irradiated from the LEDs 401R, 401G and 401B is guided to the back side of the document. The reflected light is guided to the CCDs 403 via the lens 402. The CCDs 403 output signals in response to the received reflected light. The signals show a monochrome image of the document. In other words, the image sensor 400 is a sensor for reading a monochrome image.

Figure 4:
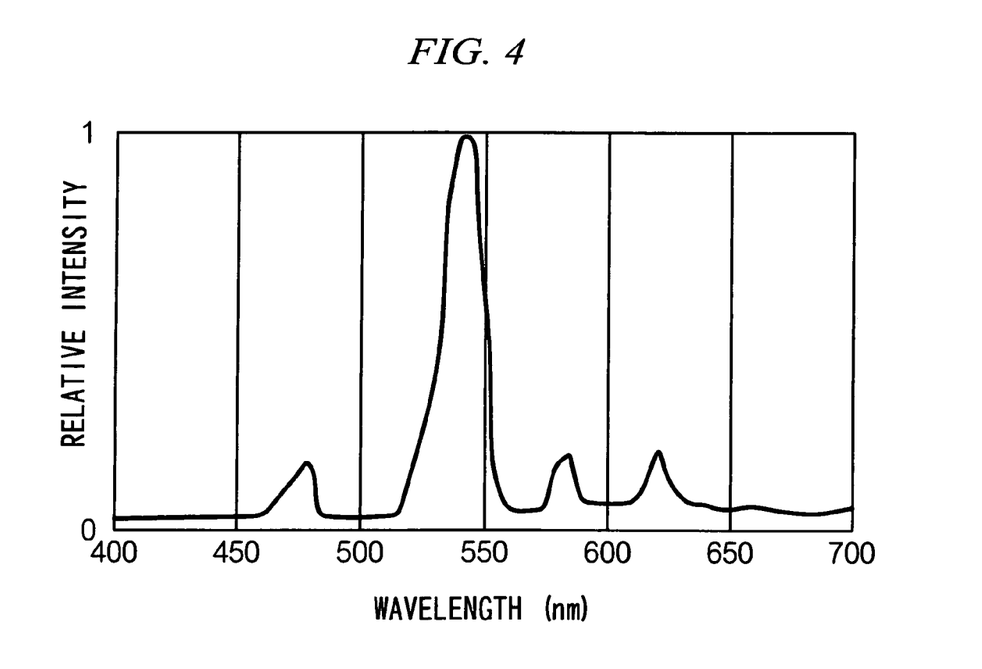
FIG. 4 shows an example of the spectral characteristics of light emitted by the xenon lamp 301.

FIG. 4 shows an example of the spectral characteristics of light emitted by the xenon lamp 301. The light intensity of the xenon lamp 301 has the largest peak at approximately 545 nm, and shows smaller peaks at approximately 485 nm, 585 nm, and 620 nm.

Figure 5:
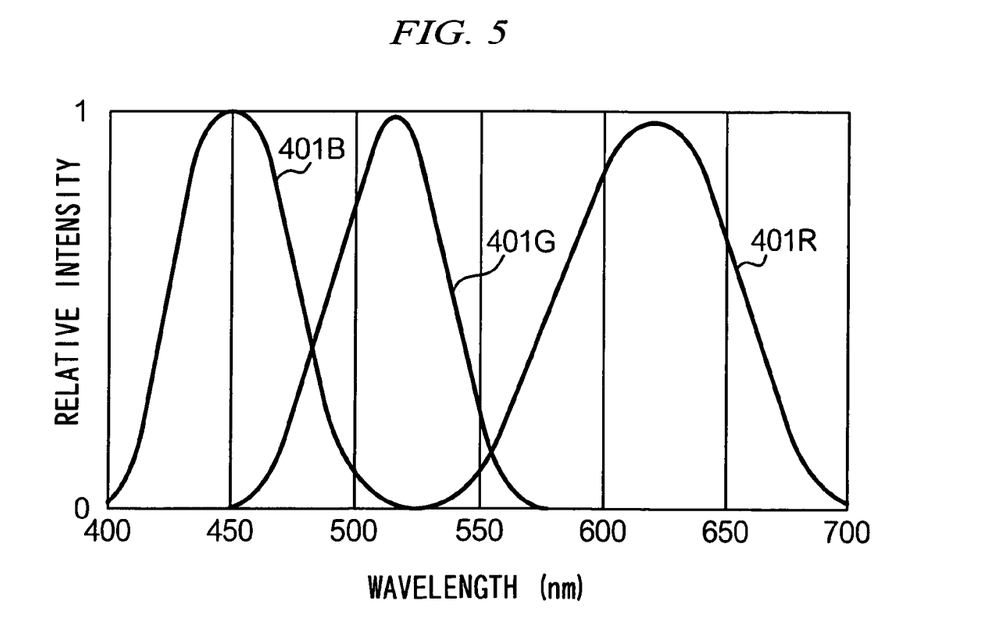
FIG. 5 shows an example of the spectral characteristics of light emitted by the LEDs 401R, 401G, and 401B.

FIG. 5 shows an example of the spectral characteristics of light emitted by the LEDs 401R, 401G, and 401B. The light intensity of the LED 401G has a peak at approximately 520 nm, which is lower than 545 nm, the peak of that of the xenon lamp 301.

The image input unit 100 has a function to simultaneously read both sides of the document by using the optical system and the image sensor 400. However, the image sensor 400 cannot read a color image. Therefore, when reading both sides of the document simultaneously, the optical system 300 uses only the CCD line sensor 306G to perform a monochrome reading of an image. In other words, when reading both sides of the document simultaneously, a monochrome reading of both sides of the document is performed.

Figure 6:
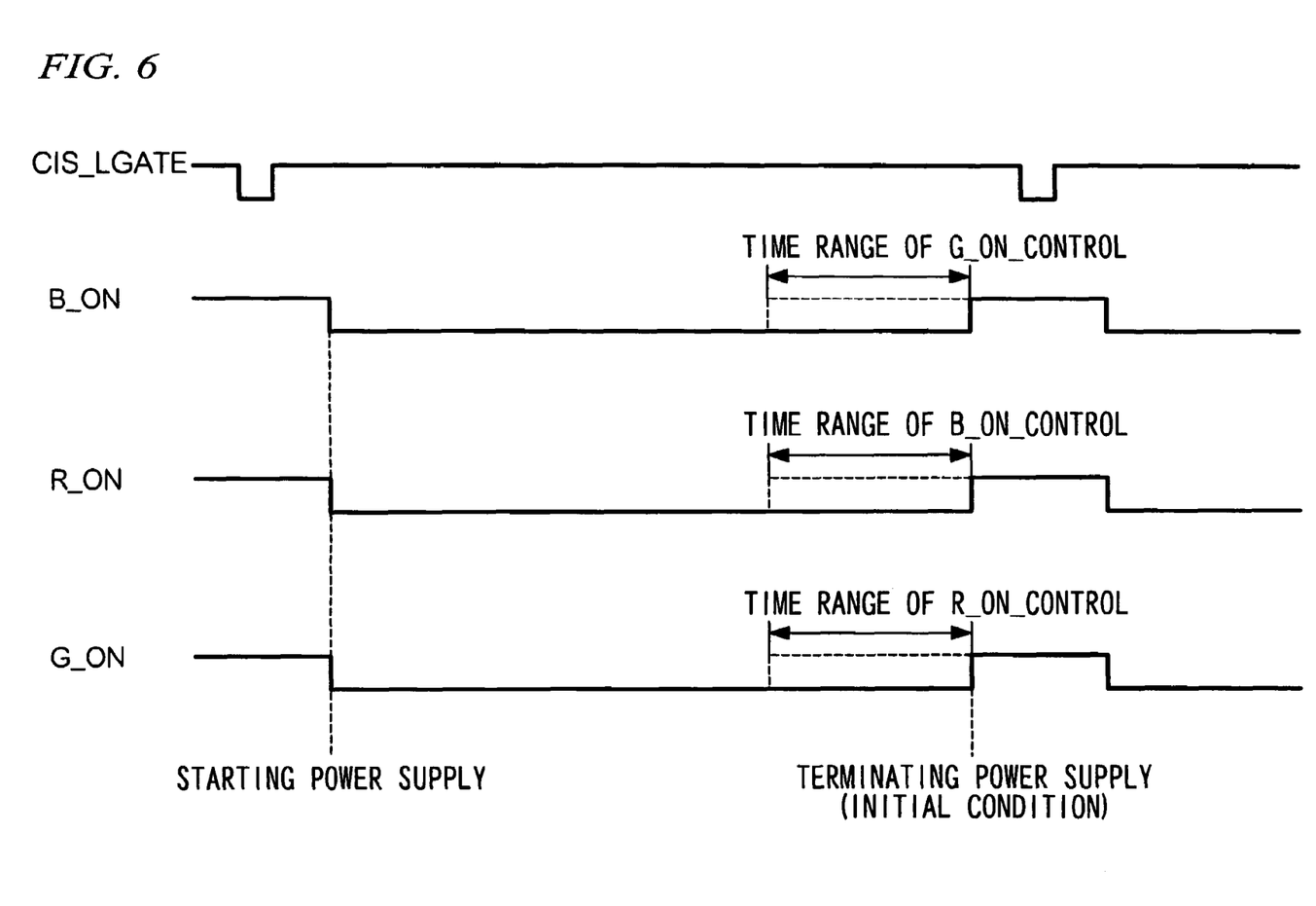
FIG. 6 shows an example of control signals for controlling time duration of irradiation of LEDs.

FIG. 6 shows an example of control signals for controlling time duration of irradiation of LEDs. The signals are outputted from the controller 4, and are inputted into an LED controller 404. The LED controller 404 supplies power to the LEDs, in response to the input signal. In FIG. 6, the horizontal axis and the vertical axis indicate time and signal level, respectively. A signal CIS_LGATE is a signal indicating timings of start and end for reading a line of image. During the signal CIS_LGATE is high, a line of image is read. When the signal CIS_LGATE turns from low to high, reading of the next line of image is initiated. A signal B_ON is a signal indicating timings of start and end for supplying power to the LED 401B. When the signal B_ON turns from high to low, supplying of power to the LED 401B is initiated and the LED 401B turns on. While the signal B_ON is low, the LED 401B irradiates light. When the signal B_ON turns from low to high, supplying of power to the LED 401B is terminated and the LED 401B turns off. Similarly to the LED 401B, the LEDs 401G and 401R are controlled in response to control signals G_ON and R_ON, respectively.

The timing to turn off the LEDs 401B, 401G, and 401R can be controlled within a time range of B_ON_CONTROL, G_ON_CONTROL, and R_ON_CONTROL, shown in FIG. 6, respectively. It is to be noted that the timings to turn on the LEDs, which is a constant, are the same for all of the LEDs.

Now, description will be given for controlling time duration of irradiation of the LEDs.

Figure 7:
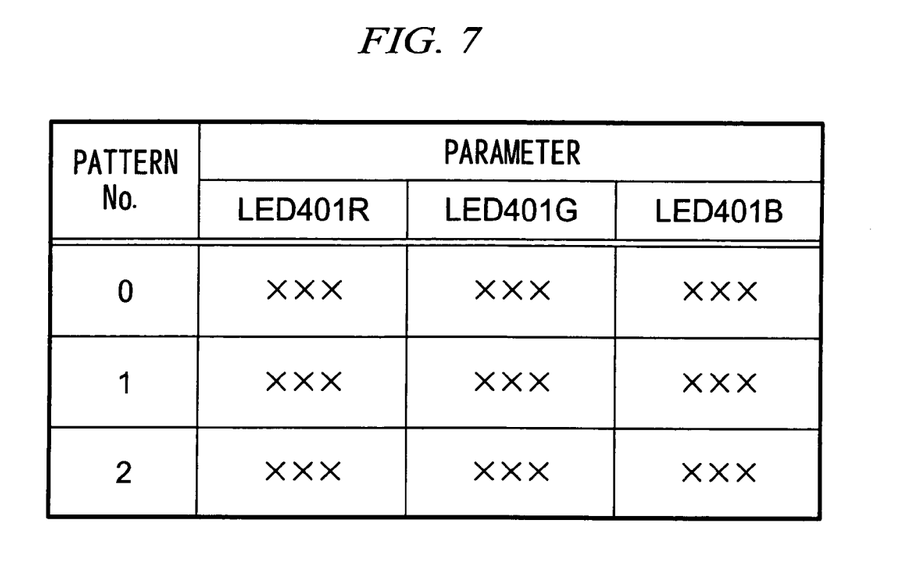
FIG. 7 shows an example of a parameter table stored in the storage unit 5.

FIG. 7 shows an example of a parameter table stored in the storage unit 5. The parameter table includes parameters for controlling time duration of irradiation of the LEDs 401R, 401G, and 401B. Each of the parameters indicates a time duration from the start point of the time range of B_ON_CONTROL, G_ON_CONTROL, and R_ON_CONTROL, shown in FIG. 6, respectively. For example, if the parameter is equal to zero, the LED will turn off at a timing when the time reaches the start point of the time range. As a result, the quantity of light, which is a product of luminous flux and time, is controlled. The control of quantity of light means a control of spectral characteristics of quantity of light of the image sensor 400. In other words, according to the present exemplary embodiment, the spectral characteristics of quantity of light of the image sensor 400 are controlled by controlling the time duration that the LED is turned on.

In the present exemplary embodiment, when using the automatic document feeder 200, both sides of the document are read as monochrome images. In this case, it is preferable to generate the same density of image, if the same image pattern is read by both sides. In the present exemplary embodiments, the parameters are determined prior to the above processing, to decrease the difference in density between both sides of the document.

First, the image reading device reads a color patch pattern, by using the optical system 300. The density of the generated monochrome image is measured. Then, the image reading device reads the same color patch pattern, by using the image sensor 400. The density of the generated monochrome image is measured. Finally, the parameters for controlling the LEDs of the image sensor 400 are determined to minimize the difference between the densities of the two images.

Details of determining the parameters are as follows. For example, the patch pattern includes a red pixel and the optical system 300 and image sensor 400 read the pixel. If the density of the pixel generated by the image sensor 400 is less than that generated by the optical system 300, the light quantity of the LED 401R is increased. Then, the image sensor 400 generates a monochrome image. The density of the image is compared with the image generated by the optical system. If the density of the pixel generated by the image sensor 400 is higher than that generated by the optical system 300, the light quantity of the LED 401R is decreased. The process is repeated until the difference between the two images is within a predetermined range. When the difference is within the predetermined range, then the parameter is determined and recorded in the table so as to correspond with the LED 401R. Similarly to red, the parameters for green and blue are determined. These processes are carried out for all colors included in the color patch pattern.

In the example shown in FIG. 7, three sets of parameters for patterns No. 1 to 3 are recorded in the table. The reason for using plural parameter sets is as follows.

In the present exemplary embodiment, the parameter is determined so that the relationship between density of a pixel of a document and that of an image generated by the image sensor 400 imitates the relationship between density of a pixel of a document and that of an image generated by the optical system 300. However, it is difficult to cover all wavelength ranges by using a single parameter set. In other words, it is difficult to reduce the difference between the densities of the front side and the back side to within a predetermined range.

Figure 8:
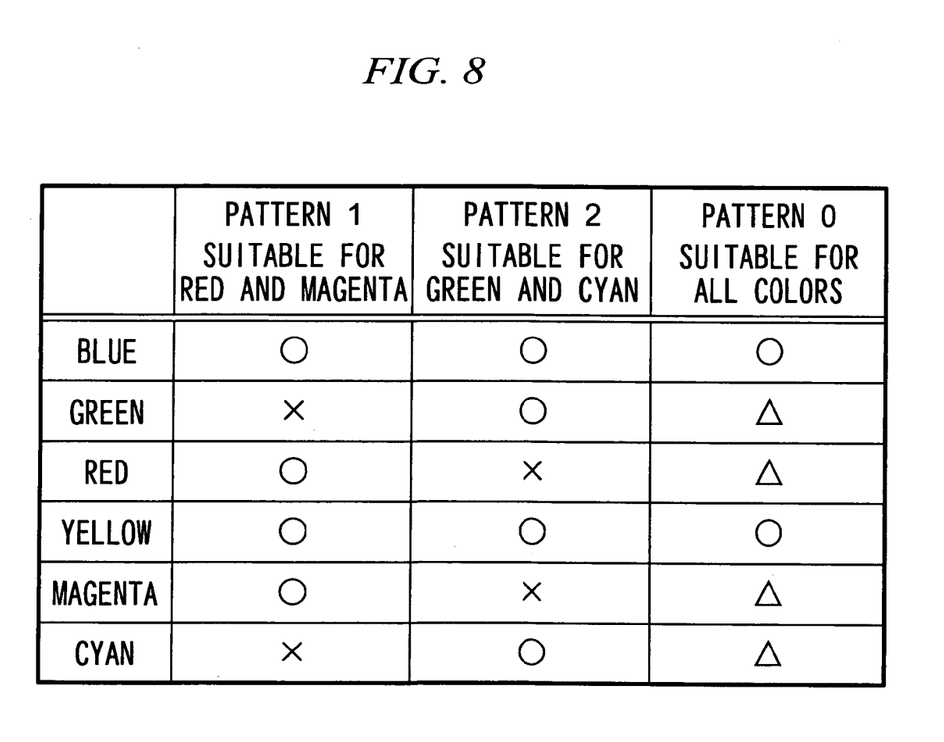
FIG. 8 shows an example of suitable combinations of pattern and wavelength.

FIG. 8 shows an example of suitable combinations of pattern and wavelength. In this example, the wavelength is categorized as six colors, blue, green, red, yellow, magenta and cyan. In FIG. 8, a mark O shows that the pattern is suitable for the color, and a mark X shows that the pattern is not suitable for the color. As shown in FIG. 8, green and red, and magenta and cyan have trade-off relationship, respectively. For example, if a parameter set is adjusted for green to decrease the difference in densities between the two sides, the parameter is not suitable for red. Further, if a parameter set is adjusted for red to decrease the difference in densities between the two sides, the parameter is not suitable for green. Magenta and cyan have the same relationship as that of red and green. Thus, in the present exemplary embodiment, plural parameter sets, each of which is suitable for different wavelength range, are recorded in a table. Thus, the parameter table is made.

Figure 9:
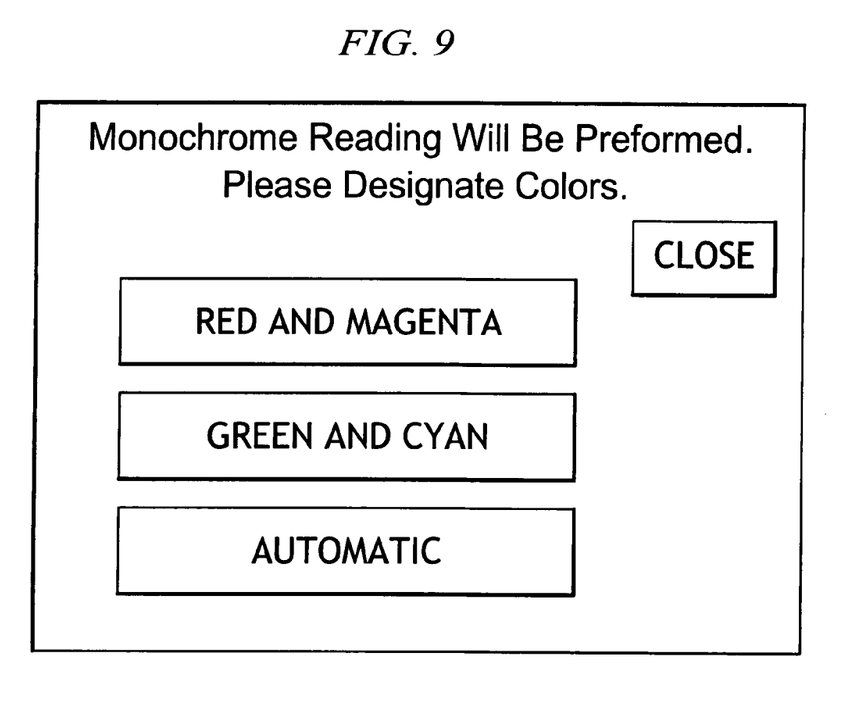
FIG. 9 shows an example of a menu displayed on the user interface 41.

A user inputs an instruction to designate a pattern by using the user interface 41. FIG. 9 shows an example of a menu displayed on the user interface 41. If the user inputs an instruction to designate "red and magenta", the parameter set No. 1 shown in FIGS. 7 and 8, is used. If the user inputs an instruction to designate "green and cyan", the parameter set No. 2 is used. If the user inputs an instruction to designate "automatic", the parameter set No. 0 is used. The parameter set No. 0 is a moderation pattern, which is not suitable for a specific wavelength range, but has approximately the same suitability for plural colors, green, red, magenta and cyan. When a user inputs an instruction, the controller 4 reads a corresponding parameter set from the parameter table. The controller 4 outputs to the LED controller 404 signals B_ON, G_ON, and R_ON in accordance with the parameter set. The LED controller 404 provides power to the LEDs 401B, 401G, and 401R in accordance with the signals B_ON, G_ON, and R_ON.

Thus, the time duration that the LED is turned on is controlled. The optical system 300 and the image sensor 400 generate signals showing images of the front side and the back side of a document, respectively. The controller 4 receives the signals, and generates raster image data by applying necessary processing, for example, shading correction and gamma correction, to the signals. The controller 4 outputs the raster image data to the image output unit 6. The image output unit 6 forms on print medium 10 an image in accordance with the raster data.

2. Modifications

The invention is not limited to the exemplary embodiment described above but may be variously modified in practice. Examples of modifications are as follows.

2-1. Modification 1

Figure 10:
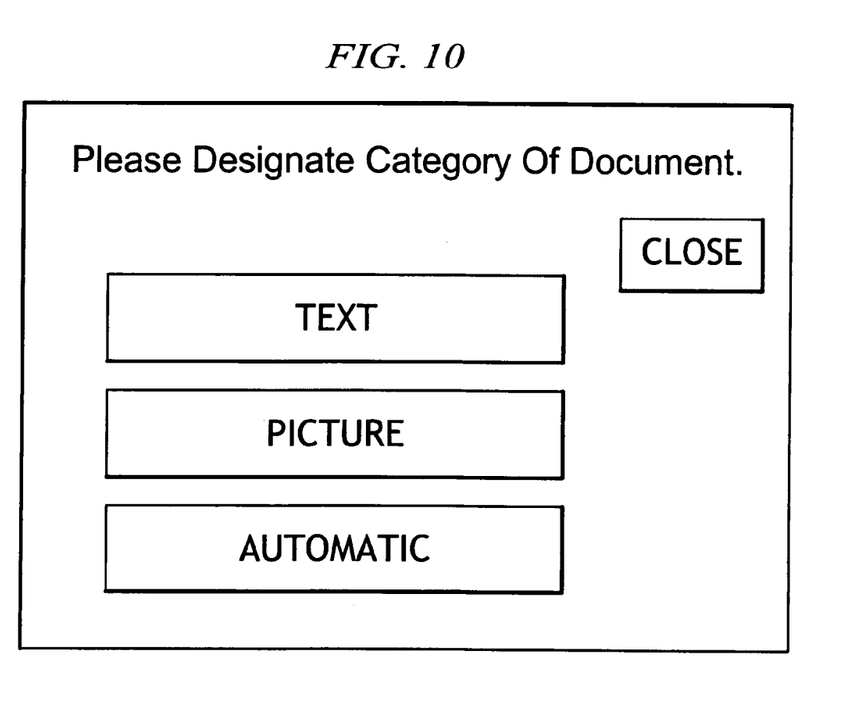
FIG. 10 shows another example of a menu displayed on the user interface 41.

The quantity of light may be controlled in response to a category of the document, instead of a color designated by a user. FIG. 10 shows another example of menu displayed on the user interface 41. The menu prompts a user to input a category of a document, for controlling input output characteristics of gamma correction in response to a category of the document. For example, a kind of gamma correction uses a correction curve, in which a slope becomes sharp at high density region to clarify an edge between a character and background when the document dominantly includes characters. However, for a document dominantly including pictures, such a correction curve cannot correctly describe the gradation of the pictures. Therefore, in the present modification, a correction curve, in which a slope is gentle, is used.

The gamma correction is performed by using signals from the optical system 300 and image sensor 400 as inputs. As has already been described, since the image input unit has two light sources having different spectral characteristics, there is a possibility of the following problem occurring. For example, the description is given for an exemplary case that the image input unit employs a gamma correction curve suitable for a text-heavy document. If the image input unit reads a picture-heavy document by using the gamma correction curve suitable for a text-heavy document, the difference between a density of a pixel of a document and that of the generated image increases compared with a case of a text-heavy document. To address the problem, in the present modification, the parameter table includes plural parameter sets, each of which corresponds to different category of picture printed on a document. The quality of light of the LED is controlled in response to a category of a picture.

2-2. Modification 2

The invention is not limited to the copier described in the exemplary embodiment. For example, the invention may be applied to an image reading device or an image input device which outputs raster image data generated by image input unit 100. The image reading device includes the controller 4, the storage unit 5, the user interface 41, the communication I/F 48 and the image input unit 100. In this case, the image input unit may output raster image data via the communication I/F 48. Alternatively, the image input unit may store the raster image data in the storage unit 5.

2-3. Modification 3

The quantity of light may be controlled by controlling of a drive current of the LED, instead of controlling of time duration of irradiation of the LED. In this case, the parameter table includes a parameter set for controlling a drive current of the LED.

2-4. Modification 4

The controller 4 may have hardware components, each of which corresponds to the functional configuration of the controller 4, instead of executing a program by the controller 4. Alternatively, a program may be installed via a storage medium such as a magnetic storage disk. Further alternatively, a program may be installed via a network.

What is claimed is:

1. An image reading device, comprising:
a first light source that irradiates light on a first side of an object;
a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable;
a memory that stores a plurality of parameters for controlling an intensity of the light emitting devices, each of the plurality of parameters corresponding to one of the plurality of groups;
a controller that controls an intensity of the light emitting devices in response to one of the plurality of parameters stored in the memory;
a first image reading unit that reads reflected light from the first side and generates monochrome image data on the basis of the read reflected light;
a second image reading unit that reads reflected light from the second side and generates monochrome image data on the basis of the read reflected light; and
a user interface that receives an instruction to indicate a color,
wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone,
wherein each of the plurality of parameters corresponds to a range of the tone, and
wherein the controller is configured to read a parameter corresponding to a tone showing the color that is indicated by the instruction received by the user interface, and is configured to control the intensity of the light emitting device in response to the read parameter.

2. An image reading device, comprising:
a first light source that irradiates light on a first side of an object;
a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable;
a memory that stores a plurality of parameters for controlling an intensity of the light emitting devices, each of the plurality of parameters corresponding to one of the plurality of groups;

a controller that controls an intensity of the light emitting devices in response to one of the plurality of parameters stored in the memory;
a first image reading unit that reads reflected light from the first side and generates monochrome image data on the basis of the read reflected light;
a second image reading unit that reads reflected light from the second side and generates monochrome image data on the basis of the read reflected light; and
a user interface that receives an instruction to indicate a color,
wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone, and
wherein each of the plurality of parameters corresponds to a category of an image, and
wherein the controller is configured to read a parameter corresponding to a category that is indicated by the instruction received by the user interface, and is configured to control the intensity of the light emitting device in response to the read parameter.

3. The image reading device according to claim 1, wherein the parameters include a time duration in which the light emitting devices irradiate light;
the controller is configured to control a time duration in which the light emitting devices irradiate light in accordance with the parameter.

4. The image reading device according to claim 1, wherein each of the light emitting devices is a light emitting diode.

5. A copier, comprising:
a first light source that irradiates light on a first side of an object;
a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable;
a memory that stores a plurality of parameters for controlling an intensity of the light emitting devices, each of the plurality of parameters corresponding to one of the plurality of groups;
a controller that controls an intensity of the light emitting devices in response to one of the plurality of parameters stored in the memory;
a first image reading unit that reads reflected light from the first side and generates monochrome image data on the basis of the read reflected light;
a second image reading unit that reads reflected light from the second side and generates monochrome image data on the basis of the read reflected light;
an image forming unit that forms on a print media, monochrome images generated by the first image reading unit and the second image reading unit; and
a user interface that receives an instruction to indicate a color,
wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone,
wherein each of the plurality of parameters corresponds to a range of the tone, and
wherein the controller is configured to read a parameter corresponding to a tone showing the color that is indicated by the instruction received by the user interface, and is configured to control the intensity of the light emitting device in response to the read parameter.

6. An image reading method, comprising:
preparing;
a first light source that irradiates light on a first side of an object,
a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable,
a memory that stores a plurality of parameters for controlling an intensity of the light emitting devices, each of the plurality of parameters corresponding to one of the plurality of groups, and
a controller that controls an intensity of the light emitting devices in response to one of the plurality of parameters stored in the memory,
reading a first reflected light from the first side;
generating a first monochrome image data on the basis of the read first reflected light;
reading a second reflected light from the second side, the second reflected light corresponding to the intensity of the light emitting devices in response to one of the plurality of parameters stored in the memory;
generating a second monochrome image data on the basis of the read second reflected light; and
receiving an instruction to indicate a color,
wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone,
wherein each of the plurality of parameters corresponds to a range of the tone, and
wherein the controller is configured to read a parameter corresponding to a tone showing the color that is indicated by the instruction received by the user interface, and is configured to control the intensity of the light emitting device in response to the read parameter.

7. A copier, comprising:
a first light source that irradiates light on a first side of an object;
a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable;

a memory that stores a plurality of parameters for controlling an intensity of the light emitting devices, each of the plurality of parameters corresponding to one of the plurality of groups;

a controller that controls an intensity of the light emitting devices in response to one of the plurality of parameters stored in the memory;

a first image reading unit that reads reflected light from the first side and generates monochrome image data on the basis of the read reflected light;

a second image reading unit that reads reflected light from the second side and generates monochrome image data on the basis of the read reflected light;

an image forming unit that forms on a print media monochrome images generated by the first image reading unit and the second image reading unit; and a user interface that receives an instruction to indicate a color, wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone, wherein each of the plurality of parameters corresponds to a category of an image, and wherein the controller is configured to read a parameter corresponding to a category that is indicated by the instruction received by the user interface, and is configured to control the intensity of the light emitting device in response to the read parameter.

8. An image reading method, comprising:

preparing;

a first light source that irradiates light on a first side of an object, a second light source that irradiates light on a second side of the object, the second light source including a plurality of light emitting devices, the plurality of light emitting devices being grouped into a plurality of groups, each of the plurality of groups corresponding to a peak wavelength of light, the intensity of the light from the light emitting devices being controllable, a memory that stores a plurality of parameters for controlling an intensity of the light emitting devices, each of the plurality of parameters corresponding to one of the plurality of groups, and a controller that controls an intensity of the light emitting devices in response to one of the plurality of parameters stored in the memory, reading a first reflected light from the first side;

generating a first monochrome image data on the basis of the read first reflected light;

reading a second reflected light from the second side, the second reflected light corresponding to the intensity of the light emitting devices in response to one of the plurality of parameters stored in the memory;

generating a second monochrome image data on the basis of the read second reflected light; and receiving an instruction to indicate a color, wherein the parameters are determined so that difference in density is smaller than a predetermined threshold, the difference in density being defined as a difference between a density of monochrome image generated by the first image reading unit and a density of monochrome image generated by the second image reading unit when the first image reading unit and the second image reading unit read pixels having the same tone, and wherein each of the plurality of parameters corresponds to a category of an image, and wherein the controller is configured to read a parameter corresponding to a category that is indicated by the instruction received by the user interface, and is configured to control the intensity of the light emitting device in response to the read parameter.

9. The image reading device according to claim 2, wherein the parameters include a time duration in which the light emitting devices irradiate light;

the controller is configured to control a time duration in which the light emitting devices irradiate light in accordance with the parameter.

10. The image reading device according to claim 2, wherein each of the light emitting devices is a light emitting diode.

* * * * *